July 7, 1959  W. R. SMITH  2,893,501
WHEEL DRIVING ARRANGEMENT FOR POWER MOWERS
Filed Oct. 8, 1954  2 Sheets-Sheet 2
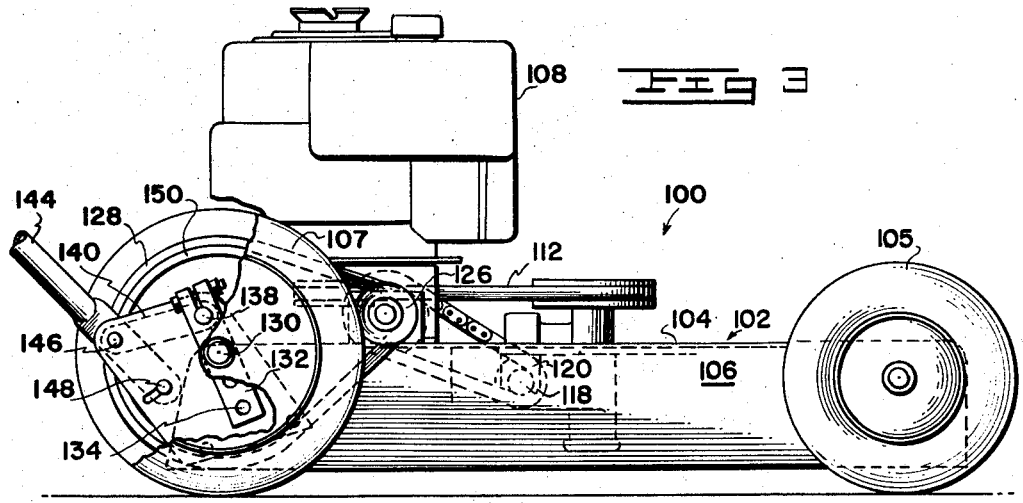
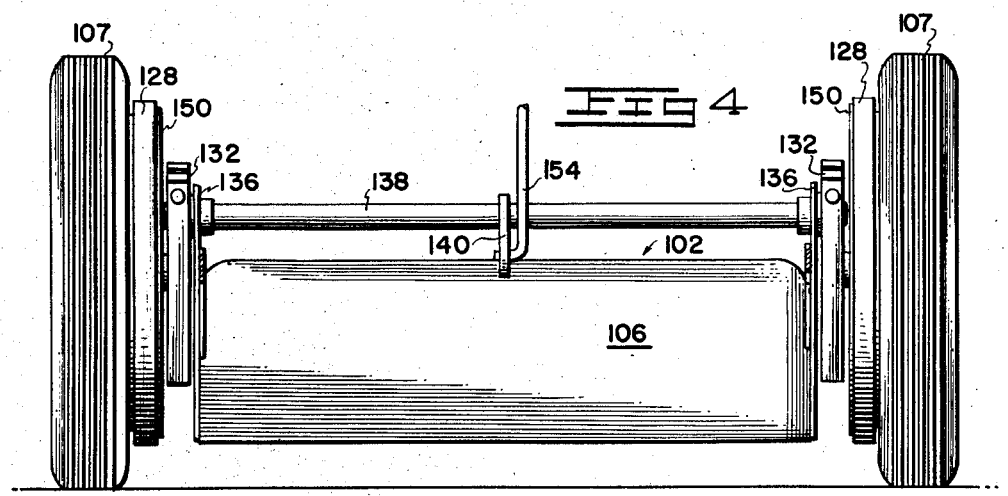
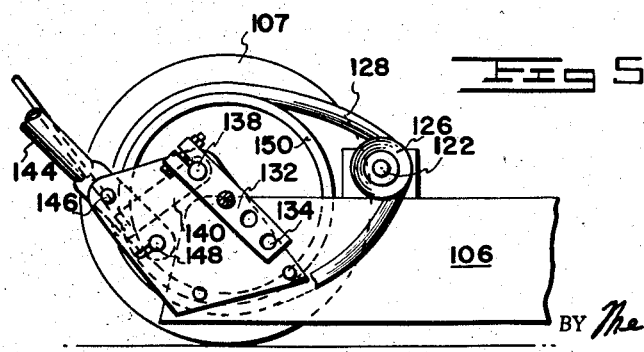
INVENTOR
William R. Smith
BY Mead, Browne, Schuyler & Beveridge
ATTORNEY

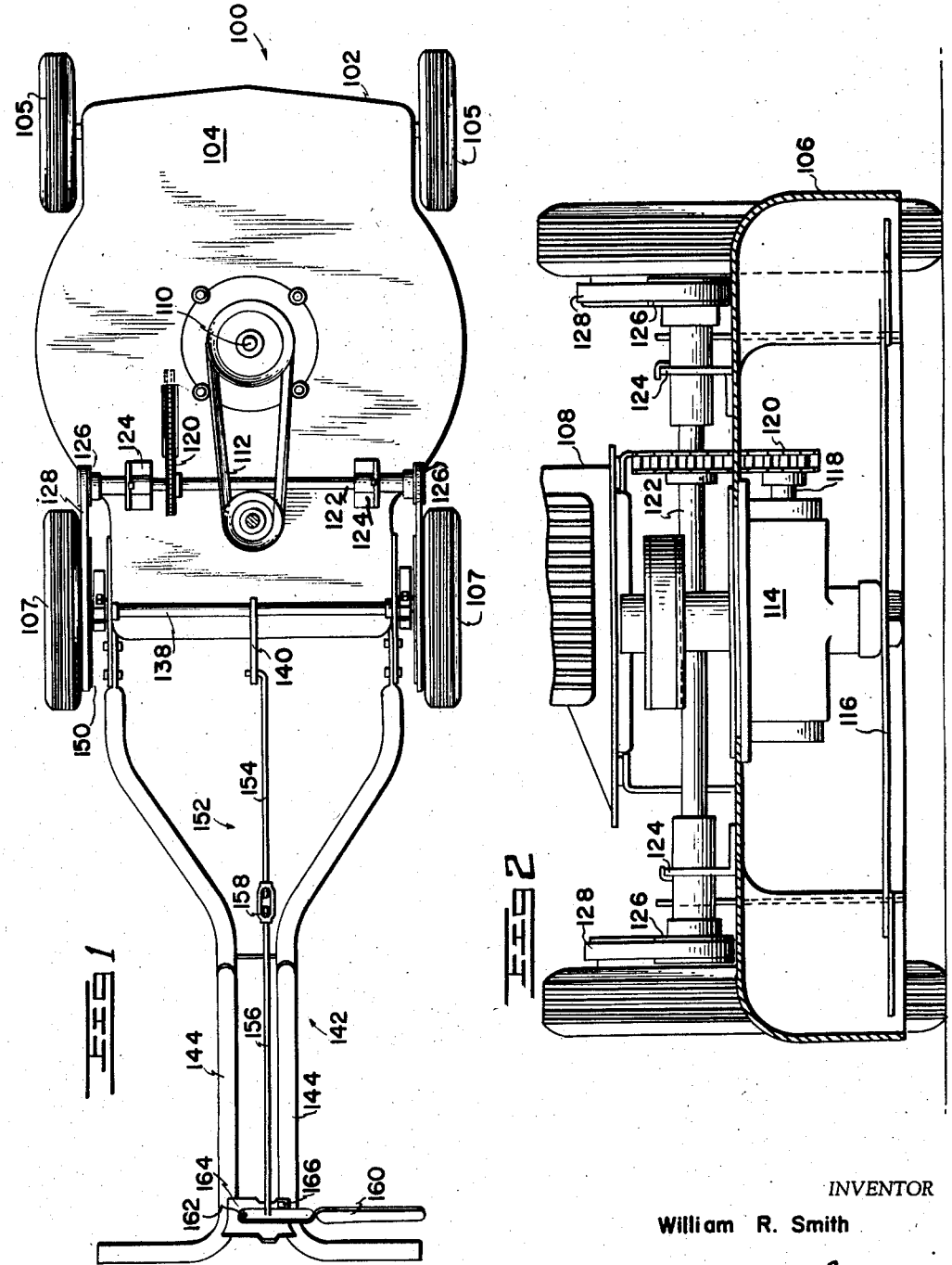

United States Patent Office 2,893,501
Patented July 7, 1959

---

2,893,501

WHEEL DRIVING ARRANGEMENT FOR POWER MOWERS

William R. Smith, Atlanta, Ga., assignor to McDonough Power Equipment, Inc., a corporation of Georgia Application October 8, 1954, Serial No. 461,256

2 Claims. (Cl. 180—19)

---

This invention relates to self-propelled mobile power units and more particularly to a power transmission and clutching arrangement for propelling the wheels of such equipment. The invention has particular utility in connection with self-propelled mower units, such as power lawn mowers, and will be described as applied to such a unit.

As a general rule, power lawn mowers of the rotary type have power-driven cutting elements, but are manually propelled along the ground surface by the operator. These mowers are generally sold in a less expensive price line than reel type mowers of equivalent capacity, and the various mechanical problems which arise in making rotary mowers self-propelled result in increased cost of manufacture which are undesirable for this class of mower. For this reason, most presently available rotary mowers are manually propelled rather than self-propelled.

Accordingly, it is an object of this invention to provide a mobile power unit, such as a self-propelled lawn mower, having a simple, inexpensive and reliable power transmission between the power drive means carried by the unit and the drive wheels which propel the unit along the ground.

It is another object of this invention to provide a self-propelled mobile power unit, such as a power lawn mower, having a simple and easily operated clutching arrangement for engaging the drive wheels which propel the unit with a power drive means.

It is a further object of this invention to provide a self-propelled mobile power unit, such as a power lawn mower, characterized by ease of maneuvering and steering, and which has great traction.

In achievement of these objectives, this invention provides a mobile power unit, such as a power lawn mower, having drive wheels which are supported for rotation on lever members pivotally mounted on the housing of the power unit in such manner that the lever members may be pivotally swung to shift the axis of rotation of the wheel members either forwardly or rearwardly. In one form of the invention, the ground-engaging drive wheels are supported for rotation by lever members pivotally supported by the mower housing and are connected by a belt drive to a power drive means. An operating means is provided for shifting the lever members on which the drive wheels are supported to control the tension on the drive belt and thereby control the drive connection between the drive wheels and the power drive means.

Further objects and advantages of the invention will become apparent from the following description taken in conjunction with the accompanying drawings in which:

Fig. 1 is a top plan view of a mower construction using a belt drive between the drive wheels and the power drive means;

Fig. 2 is a transverse cross-sectional view of the mower of Fig. 1;

Fig. 3 is a side elevation view, partially broken away, of the mower of Fig. 1;

Fig. 4 is a rear elevation, with the handle broken away, of the mower of Fig. 1; and Fig. 5 is a view in longitudinal section, partially broken away.

In the drawings there is shown a power lawn mower of the rotary type generally indicated at 100 and comprising a blade housing or casing 102 having a substantially flat horizontal upper casing portion 104 and a downwardly depending wall or skirt portion 106. The casing 102 is supported at its front end by a pair of oppositely disposed wheel members 105 and at its rear end by a pair of oppositely disposed drive wheel members 107. A power drive means in the form of a gasoline engine 108 is rigidly mounted on upper casing portion 104 and drives a vertically extending shaft 110 through a pulley belt 112. Shaft 110 passes through upper casing portion 104 and through the interior of a gear casing 114 attached to the underneath surface of casing portion 104. Shaft 110 projects below gear casing 114 and supports at its lower end a rotary cutting member 116. Projecting horizontally outwardly from gear casing 114 and driven by the gearing disposed within the gear casing, is a shaft 118 which carries at its outer end a sprocket for receiving one end of a drive chain 120. A shaft 122 is supported for rotation above casing portion 104 by means of bearing brackets 124. Drive chain 120 passes upwardly through a slot in casing portion 104 and engages a sprocket fixed to shaft 122 intermediate the length thereof. Shaft 122 carries at its opposite ends drive sheaves 126 which respectively engage oppositely disposed drive belts 128.

A bracket member 136 is rigidly attached to the rear side wall portions on each of the opposite sides of the rear end of casing 102. Each bracket 136 projects a short distance above and behind casing 102. A shaft 138 extends between and is supported for limited pivotal movement by the opposite brackets 136. A lever member 132 is rigidly attached to each of the outer ends of shaft 138, each lever 132 being disposed adjacent the outer surface of one of the bracket members 136. A crank member 140 is rigidly attached to the shaft 138 intermediate its length.

Each of the respective drive wheels 107 is supported for rotation by a stub axle 130 supported in a bearing aperture 134 of one of the lever members 132. Each lever member 132 is provided with a plurality of spaced bearing apertures 134 to permit adjustment of the height of the wheels relative to the casing. A handle generally indicated at 142 is provided to guide the mower and comprises a pair of handle elements 144 which are pivotally supported at point 146 on bracket 136. The handle is held in a fixed angularly adjusted position by a fastening means 148 which passes through the lower end of each handle element 144 and also through a slot in the bracket 136 adjacent the respective handle element.

Each of the ground-engaging drive wheels 107 has rigidly mounted on its inner surface a sheave 150 of larger diameter than the sheaves 126 on the shaft 122. One of the belts 128 passes around each pair of sheaves 126 and 150 and thus transmits drive power from the shaft 122 to each rear drive wheel 107.

An operating linkage is mounted on the handle 142 to move the drive wheels 107 into or out of driving relation with drive belt 128. This linkage is generally indicated at 152 in Fig. 1 and includes a pair of link members 154 and 156 which are adjustably connected together by a turnbuckle 158. The lower end of link 154 is pivotally connected to the outer end of crank member 140 on shaft 138. The upper end of the link 156 is rigidly connected to an operating lever 160 pivotally connected at point 162 to a support member 164 which is rigidly attached to and bridges the upper end of handle elements 144. A detent 166 is mounted on support 164 and serves to maintain operating lever 160 in a latched position when desired.

The weight of the mower assembly normally tends to swing levers 132 in a counterclockwise direction with respect to the view shown in Figs. 3 and 5, thereby moving the pivotal axis 130 of the drive wheels 107 in a counterclockwise direction. This causes the drive wheels 107 to move closer to the shaft 122 and pulley sheaves 126, with a consequent loosening of the drive belt 128. Loosening of drive belt 128 causes rear drive wheels 107 to become disengaged from the driving mechanism.

When it is desired to engage the rear drive wheels 107 with the driving mechanism, operating lever 160 is pulled upwardly and latched on detent means 166. This causes crank member 140 and shaft 138 to be rotated in a clockwise direction, thereby rotating lever members 132 in a clockwise direction. This shifts the pivotal axis 130 of the drive wheels 107 to move sheaves 150 away from sheaves 126, or in a belt-tightening direction. This position is shown in the view shown in Fig. 3 in which drive belt 128 tightly engages both sheaves 126 and 150 and transmits power from shaft 122 to rear drive wheels 107.

It can be seen from the foregoing that there is provided in accordance with this invention a self-propelled mobile power unit having a simple and reliable driving arrangement for propelling the rear drive wheels of the unit. The drive wheels may be easily shifted into or out of engagement with the driving means by a simple, reliable and easily operated shifting mechanism which may be controlled by the operator at a point adjacent the hand grips provided on the handle of the apparatus. A very smooth drive is provided between the driving mechanism and the wheels, and the wheels may be set far enough back to permit the mower to trim close to buildings.

While there has been shown and described a particular embodiment of the invention, it will be obvious to those skilled in the art that various changes and modifications may be made therein without departing from the invention and, therefore, it is aimed to cover all such modifications and changes as fall within the true spirit and scope of the invention.

What I claim as my invention is:

1. A mobile power unit comprising a housing, a power drive means carried by said housing, a wheel support lever pivotally mounted on opposite sides of said housings, a drive wheel supported by each of said levers, a shaft extending between and connected to each of said levers, a crank member rigidly connected to said shaft member intermediate the length thereof, a handle connected to said housing for directing said unit, an operating member mounted on said handle, and link means connecting said operating member to said crank member to effect movement of said shaft and said wheel support levers whereby driving engagement between said drive wheels and said power drive means is controlled.

2. A mobile power unit comprising a housing, a power drive means carried by said housing and including a drive pulley positioned adjacent each side of said housing, a ground-engaging drive wheel positioned adjacent each side of said housing, said drive wheels being positioned opposite each other and having a substantially comon axis of rotation, each drive wheel also having a driven pulley rigidly connected thereto and positioned between the drive wheel and the side of the housing to which the drive wheel is adjacent, a drive belt extending between each drive pulley and driven pulley which are adjacent the same side of the housing, support brackets carried by said housing and extending upwardly with respect to said housing adjacent each side of said housing and rearwardly of said power drive means, a shaft extending transversely with respect to said housing and supported for rotation by said support brackets, and an arm extending downwardly from said shaft adjacent each end of said shaft, each arm rotatably supporting one of said ground-engaging drive wheels and said arms being swingable simultaneously in the same direction in response to rotation of said shaft, the axis of rotation of said shaft being located rearwardly of the axis of rotation of said ground-engaging drive wheels whereby the weight of said housing biases each arm supporting a drive wheel to a position wherein each drive belt is slack.

References Cited in the file of this patent

UNITED STATES PATENTS

| | | |
|---|---|---|
| 2,598,768 | Donald | June 3, 1952 |
| 2,604,747 | Bash | July 29, 1952 |
| 2,657,408 | Machovec | Nov. 3, 1953 |
| 2,689,620 | Hainke | Sept. 21, 1954 |
| 2,691,421 | Swanson | Oct. 12, 1954 |
| 2,708,484 | Hoffman | May 17, 1955 |
| 2,740,485 | Mohler | Apr. 3, 1956 |

FOREIGN PATENTS

| | | |
|---|---|---|
| 429,201 | France | July 10, 1911 |